United States Patent

Tsao

[11] Patent Number: 6,006,967
[45] Date of Patent: Dec. 28, 1999

[54] MULTI-USAGE BABY PACKSACK

[76] Inventor: Chung-Tao Tsao, 4th Fl., No. 67, Alley 66, Sec. 2, Chung Hua Rd., Taipei, Taiwan

[21] Appl. No.: 09/150,032

[22] Filed: Sep. 9, 1998

[51] Int. Cl.⁶ .................................................. A45F 4/02
[52] U.S. Cl. ........................ 224/153; 224/158; 224/576; 224/583; 297/217.1; 297/485
[58] Field of Search ..................................... 224/153, 158, 224/159, 160, 575–585, 627; 297/485, 484, 217.1

[56] References Cited

U.S. PATENT DOCUMENTS

| | | | |
|---|---|---|---|
| 1,326,716 | 12/1919 | Dunning | 297/485 X |
| 4,424,841 | 1/1984 | Smith | 224/583 X |
| 4,903,873 | 2/1990 | Poole et al. | 224/158 X |
| 5,178,309 | 1/1993 | Bicheler | 224/153 |
| 5,190,306 | 3/1993 | Nauman et al. | 224/160 X |
| 5,234,143 | 8/1993 | Mahvi et al. | 224/585 X |
| 5,544,792 | 8/1996 | Arnwine | 224/580 X |

*Primary Examiner*—Gregory M. Vidovich
*Attorney, Agent, or Firm*—Rosenberg, Klein & Lee

[57] ABSTRACT

A multi-usage packsack comprising a bag, a piece body; and a zipper attached about the periphery of each of the bag and piece body for connecting the bag to the piece body. The packsack comprising linking belts each having a first end with a first fastener and a second end with a second fastener. The piece body having first and second shoulder straps and a torso strap having primary fasteners connected thereto and secondary fasteners respectively connected on opposing lateral sides at a lower portion thereof such that when the bag is attached to the piece body by the zipper, the shoulder straps are placable on a baby's shoulders and the primary and secondary fasteners are secured together for securing the packsack to the baby. The piece body including first and second pairs of bearing belts. Each bearing belt having a free end with a third fastener connected thereto, wherein, during use as a restraint device, the bag and the piece body are detached, the shoulder straps are placable on the baby's shoulders, the primary and secondary fasteners are secured together for securing the piece body to the baby, one of the first pair and one of the second pair of bearing belt third fasteners are respectively connected to the first fasteners of the linking belts and the second fasteners are securable to buckling devices of a car safe belt for securing the baby in the car.

4 Claims, 4 Drawing Sheets

MULTI-USAGE BABY PACKSACK

BACKGROUND OF THE INVENTION

The present invention relates to a multi-usage baby packsack, especially to a packsack structure has the function of a packsack and may be linked with the car safe belt.

In the general used baby packsack, straps are installed on the two sides of a bag so that two arms of the baby may penetrate through the straps, and then the baby is carried. However, since in this structure, the straps are not connected with each other, thus in using, the baby is easy to slide downwards. Thus it is inconvenient in using. Further, the general used car safe belt is design for adults, thus the surrounding range is large and is not suitable for a baby. Therefore, the baby has not been properly protected.

SUMMARY OF THE INVENTION

Accordingly, the object of the present invention is to provide a multi-usage baby packsack comprising a bag and a piece body, zippers for connecting therewith is installed on the peripheries of the bag and piece body, respectively. A crossing strap is installed one the piece body, primary fasteners are installed on the two ends of the strap, respectively. Connecting belts having secondary fasteners are installed on two sides of the lower portion of the piece body so that when the bag is buckled with the bag by zippers, the piece body may be used to bear a baby. Since the crossing strap is structure such that the baby's hands are placed therethrough, the baby may be prevented from sliding downwards.

Another object of the present invention is to provide a multi-usage baby packsack, wherein bearing belts with primary fasteners are installed on the four corners of the piece body, respectively. During using a safe belt, the piece body is carried on the back of the baby and the bag is detached, so that when the two linking belts are buckled on the respective bearing belts, the linking belts are pivotally connected with secondary fastener and primary fastener seat of a car safe belt. Therefore, the safe belt is suitable for a baby.

BRIEF DESCRIPTION OF THE DRAWINGS

The present invention will be better understood and its numerous objects and advantages will become apparent to those skilled in the art by referencing to the following drawings in which.

DESCRIPTION OF THE PREFERRED EMBODIMENT

Figure 1:
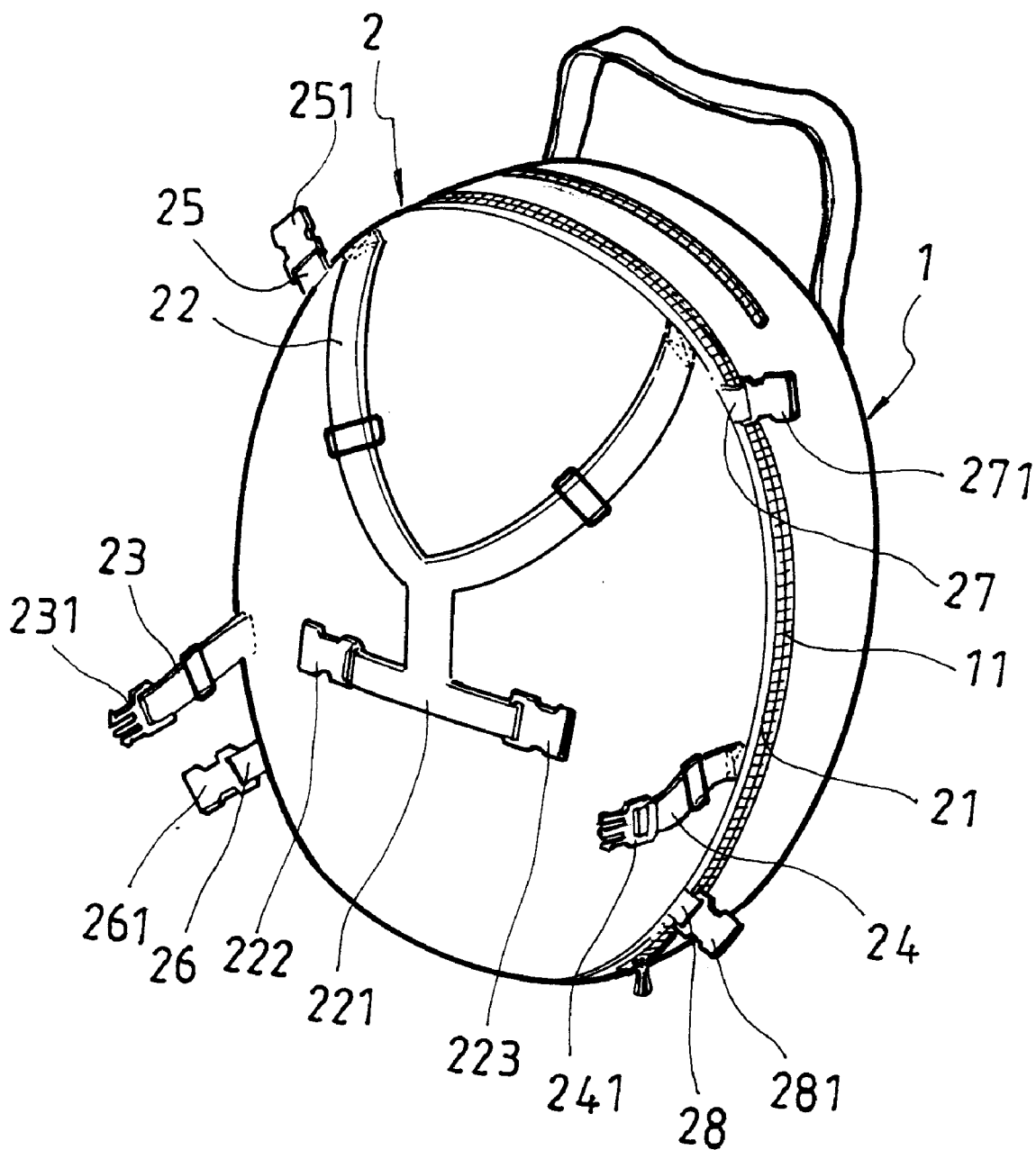
FIG. 1 is a perspective view of the present invention.
Figure 2:
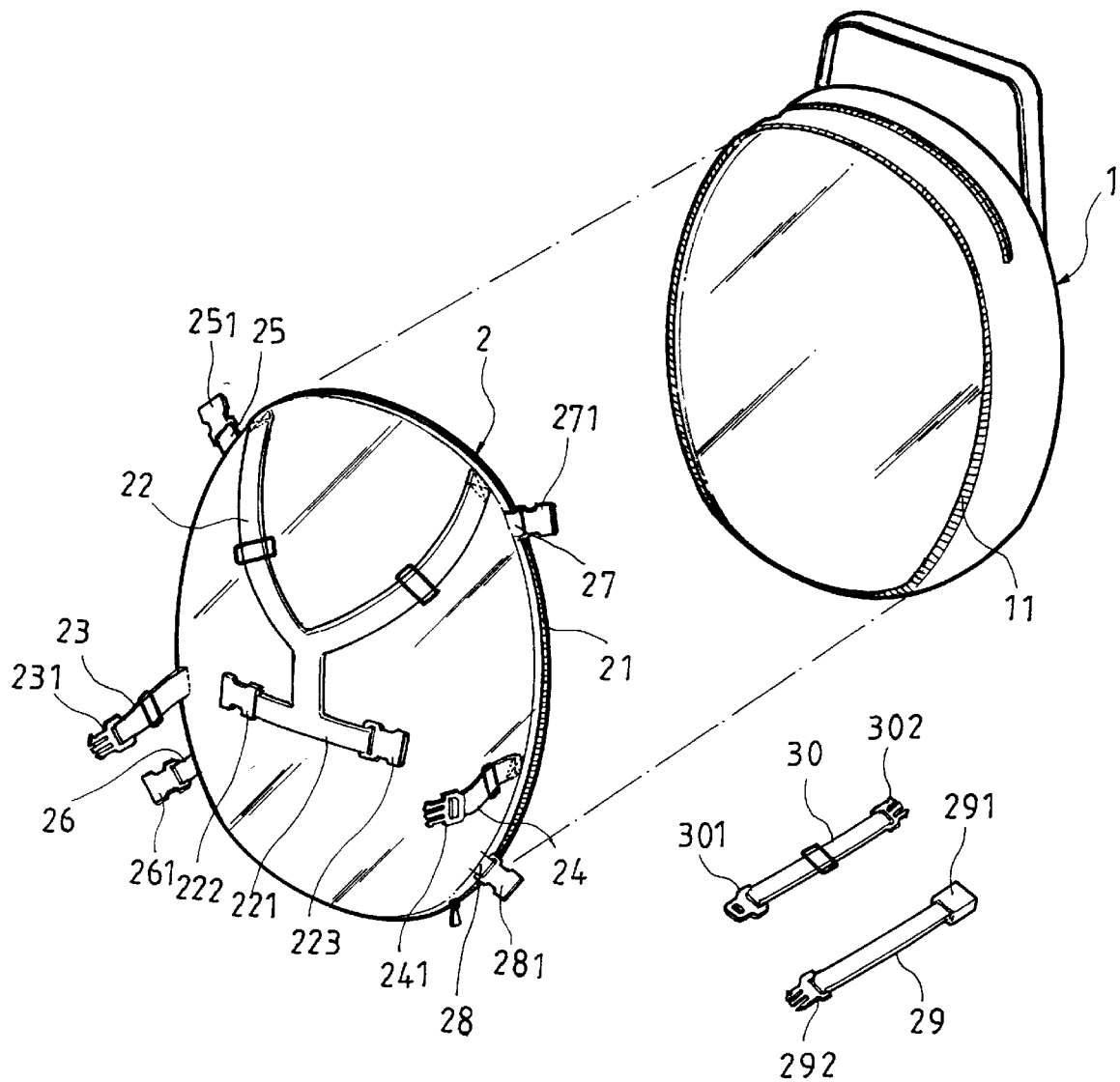
FIG. 2 is an exploded view of the present invention.

Referring now to FIGS. 1 and 2, the multi-usage baby packsack of the present invention includes a bag (1) and a piece body (2), wherein zippers for connecting therewith are installed on the peripheries of the bag (1) and the piece body (2), respectively. The bag (1) includes a zipper closure and a handle attached thereto. A crossing strap (22) is installed on the piece body (2). Primary fasteners (222) and (223) are installed on the two ends of the horizontal portion (221) of the strap (22), respectively. Connecting belts (23) and (24), the front end of which have secondary fasteners (231) and (241), are installed on the two sides of the lower portion of the piece body (2), so that when the piece body (2) is buckled with the bag (1) by zippers, the baby's hands may expose outwards from the strap so the bag will have a function of a packsack. Since the strap (22) has a crossed shape, the packsack may be prevented to slide downwards.

Bearing belts (25), (26), (27) and (28) are installed on the four corners of the piece body (2), respectively. Primary fasteners (251), (261), (271), (281) are installed on the front end of the bearing belts, respectively so to connect with linking belts (29) and (30), the front end of which is designed according to the buckling device of the car safe belt (291) and (301). Thus, the linking belts (29) and (30) are pivotally connected with the secondary fastener (31) and the primary fastener (32) of the car safe belt (3). Therefore, the safe belt (3) is suitable for a baby.

Figure 3:
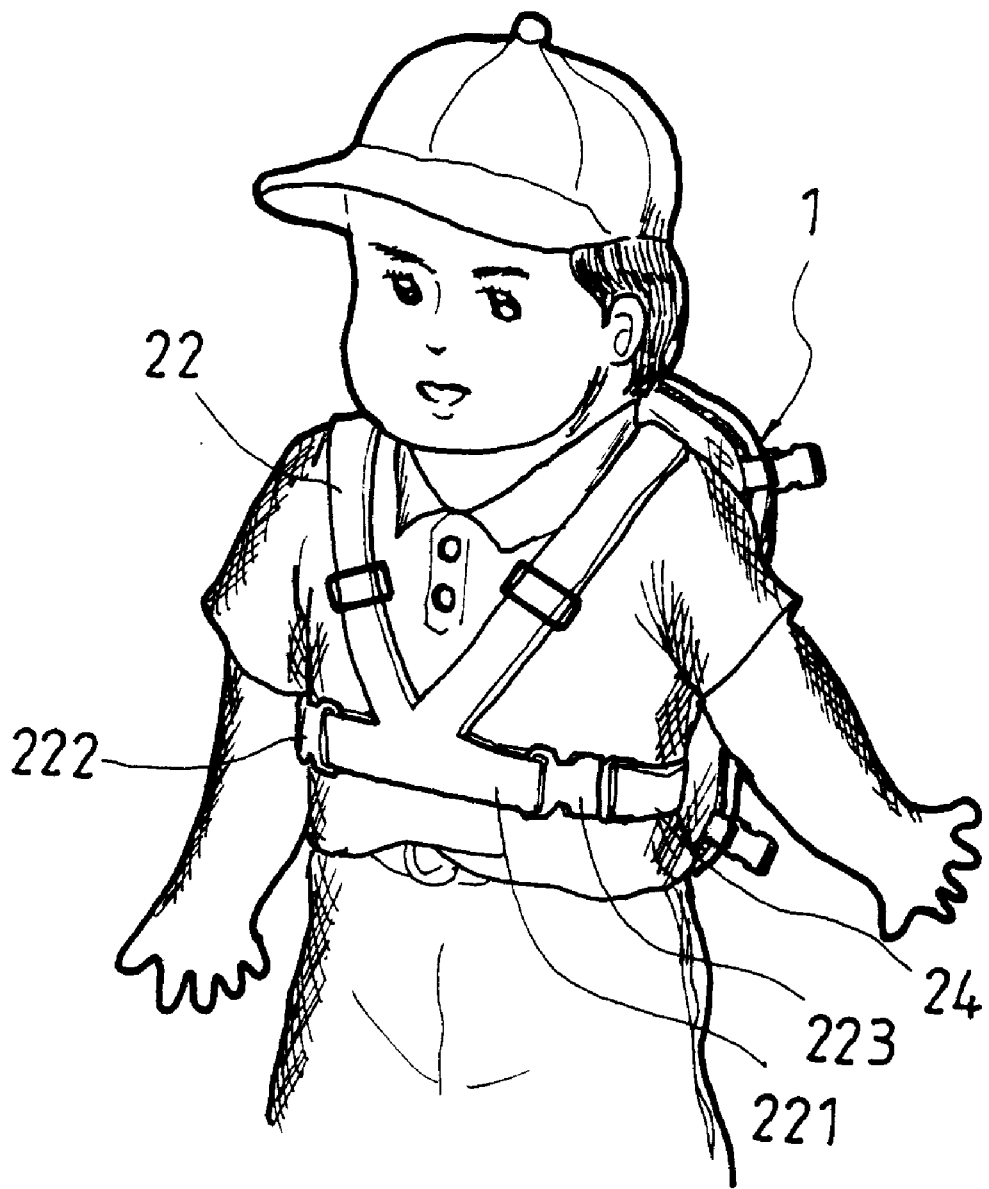
FIG. 3 is a schematic view of the embodiment of the present invention about the using of a packsack.

Referring to FIG. 3, during using the packsack of the present invention, the bag (1) and the piece body (2) are buckled with each other to from a packsack. Thus, the hands of the user may penetrate through the two horizontal portions (221) of the strap (22) so to be carried. Since the strap (22) is crossed in front of user's breast, the packsack may be prevented to slide downwards.

Figure 4A:
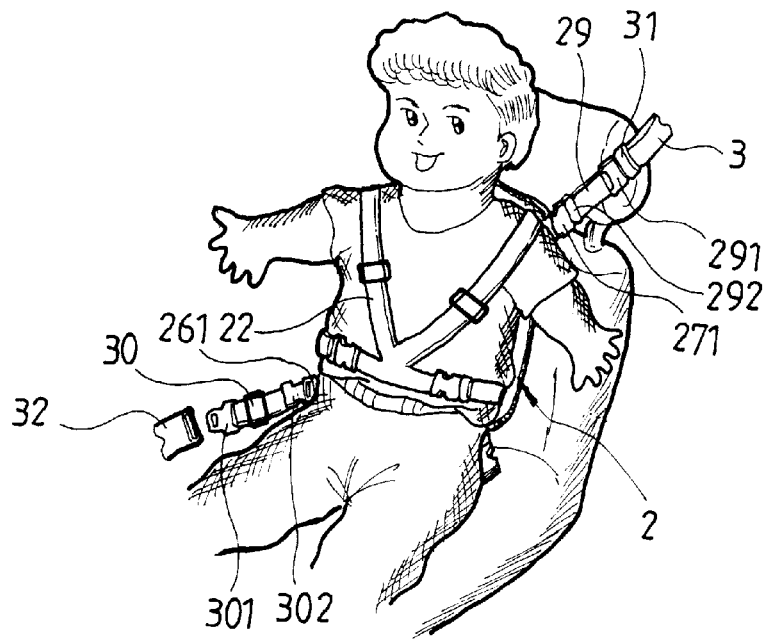
FIG. 4 is a schematic view of the embodiment of the present invention about the using of a safe belt.
Figure 4B:
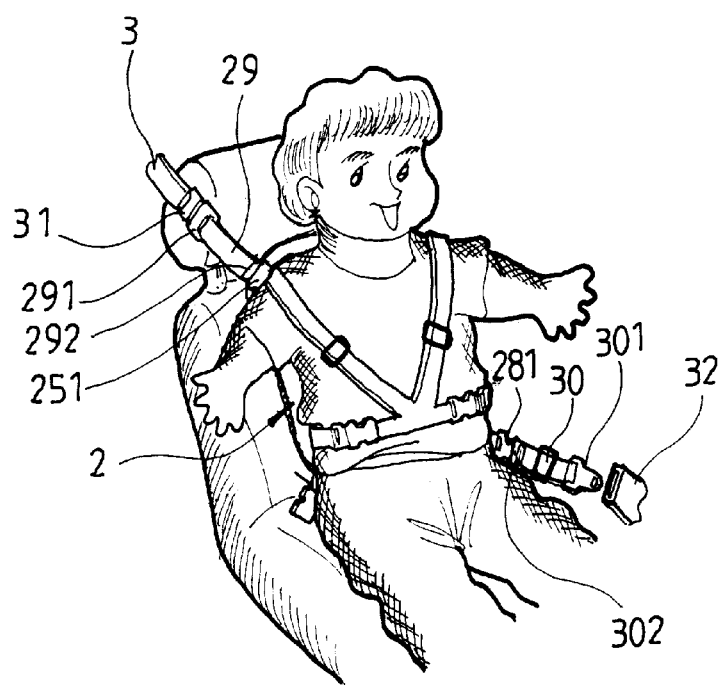

Referring now to FIG. 4, during using a safe belt (3), the piece body (2) is carried on the back of the baby and the bag (1) is detached. Then the secondary fasteners (292) and (302) of the linking belts (29) and (30) are buckled with the bearing belts (27) and (26), respectively. Buckling devices (291) and (301) are formed on another end of the linking belts (29) and (30) so that the secondary fastener (31) of the safe belt (3) can be buckled on the primary fastener (291) of the linking belt (29), and secondary fastener (301) of another linking belt (30) can be buckled with the primary fastener seat (32) of the safe belt. Therefore, the safe belt (3) is also suitable for a small baby (as shown in FIG. 4A). Of course, if the orientation of the safe belt is different, then the linking belts (29) and (30) may be buckled with the bearing belts (25) and (28). Therefore, the effect of the safe belt (3) is also achieved.

Accordingly, the in the present invention, by the piece body with crossing strap and bearing belt, when it is combined with a bag, the present invention may be used as a packsack. Another, it may be connected with the safe belt of a car, then the safe belt is suitable for a baby.

Those skilled in the art will readily recognize various modifications and changes which may be made to the present invention without strictly following the exemplary embodiment and application illustrated and described herein, and without departing from the true spirit and scope of the present invention which is set forth in the following claims.

What is claimed is:

1. A multi-usage packsack comprising:

a bag, a piece body; and zipper means attached about the periphery of each of said bag and said piece body for connecting said bag to said piece body; said packsack further comprising linking belts each having a first end with a first fastener and a second end with a second fastener, said piece body having first and second shoulder straps and a torso strap, a first end of each said shoulder strap connected to said piece body and the opposing end of each said shoulder strip connected to said torso strap to define free ends of said torso strap, each free end including a primary fastener, said piece body further including a pair of secondary fasteners respectively connected on opposing lateral sides at a lower portion thereof such that when said bag is attached to said piece body by said zipper means, said shoulder straps are respectively placable on a baby's shoulders and said primary and secondary fasteners are secured together for securing said bag and said piece body to the baby; said piece body further including a first pair of bearing belts respectively attached to opposing lateral sides at an upper portion thereof and a second pair of bearing belts respectively attached to opposing lateral sides at said lower portion thereof, each said bearing belt having a free end with a third fastener connected thereto, wherein, during use as a restraint device, said bag and said piece body are detached, said shoulder straps are respectively placable on the baby's shoulders, said primary and secondary fasteners are secured together for securing said piece body to the baby, one of said first pair and one of said second pair of bearing belt third fasteners are respectively connected to said first fasteners of said linking belts and the second fasteners are securable to buckling means of a car safe belt for securing the baby in the car allowing the car safe belt to be suitable for the baby.

2. The packsack of claim 1 wherein the securement of said second fasteners with said buckling means of the car safe belt provides a pivotal connection.

3. The packsack of claim 1 wherein said bag includes a zipper closure.

4. The packsack of claim 1 wherein said bag includes a handle attached thereto.

* * * * *